United States Patent
Pantalone, III et al.

(10) Patent No.: US 11,498,671 B2
(45) Date of Patent: Nov. 15, 2022

(54) REPLACEMENT TIP SECTION FOR A ROTOR BLADE AND METHOD OF REPLACING A ROTOR BLADE TIP SECTION

(71) Applicant: LOCKHEED MARTIN CORPORATION, Bethesda, MD (US)

(72) Inventors: Joseph Pantalone, III, Guilford, CT (US); Timothy James Conti, Shelton, CT (US); Daniel Caleb Sargent, Easton, CT (US); Benjamin Edward Isabella, Hamden, CT (US); Masruk Siddique, Stratford, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 315 days.

(21) Appl. No.: 16/690,447

(22) Filed: Nov. 21, 2019

(65) Prior Publication Data

US 2020/0361600 A1 Nov. 19, 2020

Related U.S. Application Data

(60) Provisional application No. 62/847,268, filed on May 13, 2019.

(51) Int. Cl.
*B64C 27/46* (2006.01)
*B64F 5/40* (2017.01)

(52) U.S. Cl.
CPC .............. *B64C 27/463* (2013.01); *B64F 5/40* (2017.01); *Y10T 29/49732* (2015.01)

(58) Field of Classification Search
CPC ......... Y10T 29/49732; Y10T 29/49734; Y10T 29/49735; Y10T 29/49739; Y10T 29/49741; B64C 27/463
See application file for complete search history.

(56) References Cited

U.S. PATENT DOCUMENTS

| | | | | |
|---|---|---|---|---|
| 3,721,507 A | * | 3/1973 | Monteleone | B64C 27/463 416/223 R |
| 3,782,856 A | * | 1/1974 | Salkind | B64C 27/473 428/116 |
| 4,324,530 A | * | 4/1982 | Fradenburgh | B64C 27/463 416/228 |
| 4,880,355 A | * | 11/1989 | Vuillet | B64C 27/463 416/228 |

(Continued)

*Primary Examiner* — Jason L Vaughan
(74) *Attorney, Agent, or Firm* — Foley & Lardner LLP

(57) ABSTRACT

A replacement tip section for a rotor blade, from which a legacy tip section was removed, includes a blade tip portion configured to be attached to an intermediate section of the rotor blade after removal of the legacy section. The intermediate section has a connection feature at an end of the intermediate section to which the blade tip portion is attachable. The replacement tip section includes a transition region configured to be attached to a forward end of the connection feature. The transition region is configured to form a leading edge of the rotor blade and extends from the blade tip portion to form an opening into which the intermediate section is attached. The transition region includes a first end having a first airfoil that conforms to the intermediate section airfoil at the connection feature, and a second end having a second airfoil that conforms to the blade tip portion.

9 Claims, 11 Drawing Sheets

(56) References Cited

U.S. PATENT DOCUMENTS

| | | | |
|---|---|---|---|
| 5,320,494 A | | 6/1994 | Reinfelder et al. |
| 5,885,059 A | * | 3/1999 | Kovalsky ............. B64C 27/463 |
| | | | 416/224 |
| 6,976,829 B2 | * | 12/2005 | Kovalsky ............... B64C 27/46 |
| | | | 416/237 |
| 7,237,751 B2 | * | 7/2007 | Anning ................ B64C 27/473 |
| | | | 244/123.3 |
| 7,246,998 B2 | | 7/2007 | Kovalsky et al. |
| 7,513,750 B2 | * | 4/2009 | Moffitt ................. B64C 27/463 |
| | | | 416/228 |
| 7,758,312 B2 | * | 7/2010 | Leahy .................. B64C 27/473 |
| | | | 416/224 |
| 7,771,173 B2 | | 8/2010 | Leahy et al. |
| 8,096,779 B2 | * | 1/2012 | Rochegude ........... B64C 27/473 |
| | | | 416/226 |
| 9,056,674 B2 | * | 6/2015 | White .................. B64C 27/473 |
| 10,351,229 B2 | * | 7/2019 | Simkulak ............. B64C 27/463 |
| 11,066,188 B2 | * | 7/2021 | Lofstrom ................. B64F 5/40 |
| 11,242,140 B2 | * | 2/2022 | Pantalone, III .... B29D 99/0025 |
| 11,261,735 B2 | * | 3/2022 | Sutton ..................... F01D 5/147 |

\* cited by examiner

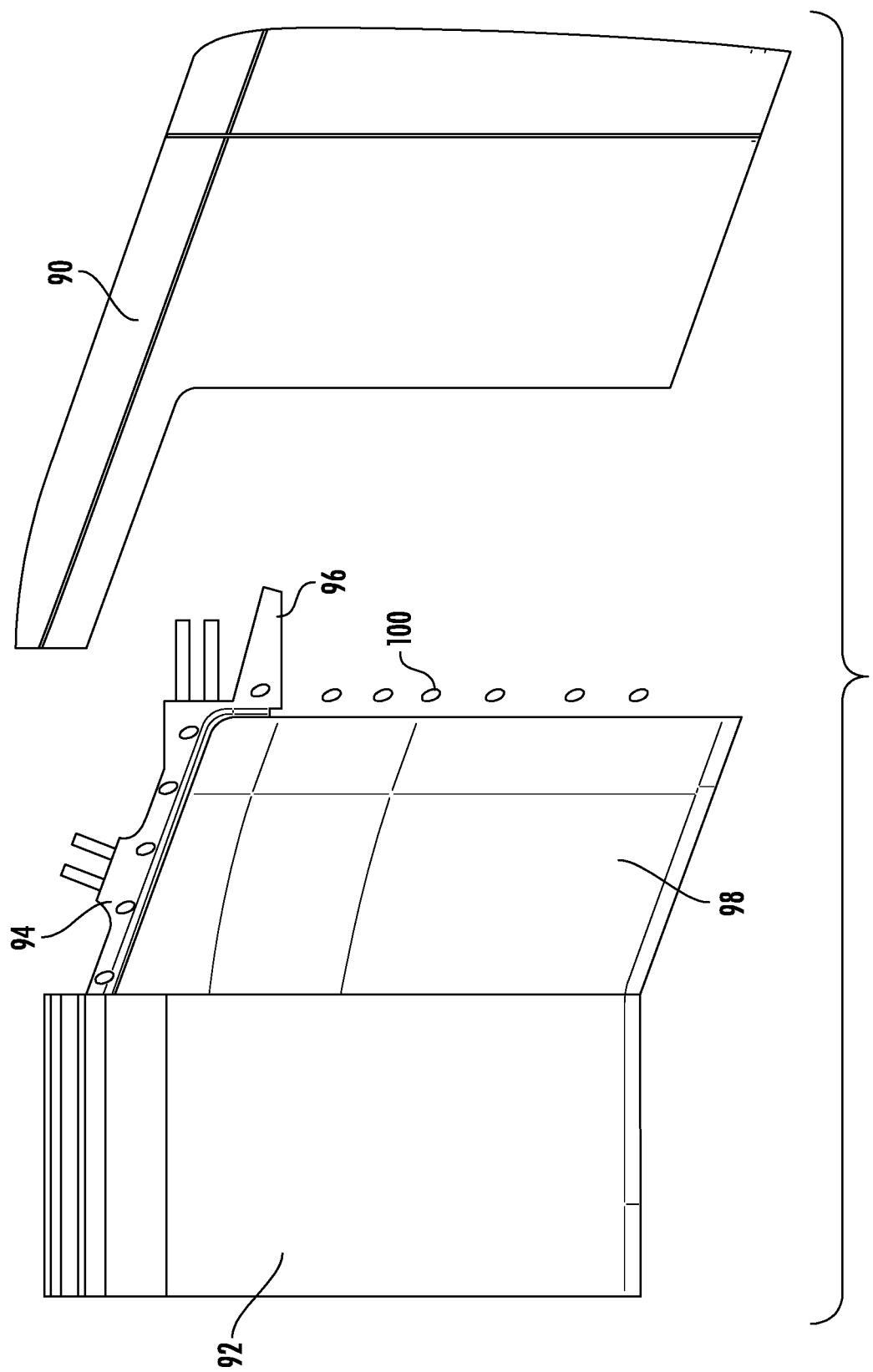

REPLACEMENT TIP SECTION FOR A ROTOR BLADE AND METHOD OF REPLACING A ROTOR BLADE TIP SECTION

CROSS REFERENCE TO RELATED APPLICATIONS

The present invention claims priority to U.S. Provisional Application Ser. No. 62/847,268, filed May 13, 2019, the contents of which are incorporated herein by reference in their entirety.

BACKGROUND

The present disclosure relates to the art of aircraft blades, and more particularly, to replacement of blade tip sections of rotor blade assemblies.

Many modern helicopters and some fixed wing aircraft include rotor blades (e.g., helicopter rotor blades). A typical blade includes a root section, an intermediate section and a tip section. In order to improve performance, a typical approach is to design a new rotor blade. However, while the new rotor blade may achieve the desired performance, this approach does not address the utility of legacy rotor blades.

BRIEF DESCRIPTION

According to one or more embodiments, a replacement tip section, for a rotor blade from which a legacy tip section was removed, includes a blade tip portion having a first end and an opposing end. The blade tip portion is configured to be attached to an intermediate section of the rotor blade after removal of the legacy tip section, and the intermediate section has a connection feature at an end of the intermediate section to which the blade tip portion is attachable. The replacement tip section also includes a transition region configured to be attached to a forward end of the connection feature at an end of the intermediate section, and the transition region is configured to form a leading edge of the rotor blade and extend from the blade tip portion to form an opening into which the intermediate section is attached to the transition region and the blade tip portion. The transition region includes a first end having a first airfoil that conforms to the intermediate section airfoil at the connection feature, and a second end having a second airfoil that conforms to the blade tip portion.

According to one or more embodiments, a method of replacing a tip section of a rotor blade includes removing a legacy tip section from an end of an intermediate section of the rotor blade to expose a connection feature at the end of the intermediate section, and connecting a replacement tip section to the intermediate section. The replacement tip section includes a blade tip portion having a first end and an opposing end, and a transition region which extends from the blade tip portion to form a leading edge of the rotor blade at the intermediate section. Connecting the replacement tip section includes attaching the transition region to a forward end of the connection feature to form the leading edge at the intermediate section. The transition region includes a first end having a first airfoil that conforms to an intermediate section airfoil at the connection feature, and a second end having a second airfoil that conforms to the blade tip portion.

BRIEF DESCRIPTION OF THE DRAWINGS

The following descriptions should not be considered limiting in any way. With reference to the accompanying drawings, like elements are numbered alike:

FIG. 9 depicts aspects of an embodiment of a method of replacing a rotor blade tip section;

DETAILED DESCRIPTION

A detailed description of one or more embodiments of the disclosed apparatus and method are presented herein by way of exemplification and not limitation with reference to the Figures.

Figure 1:
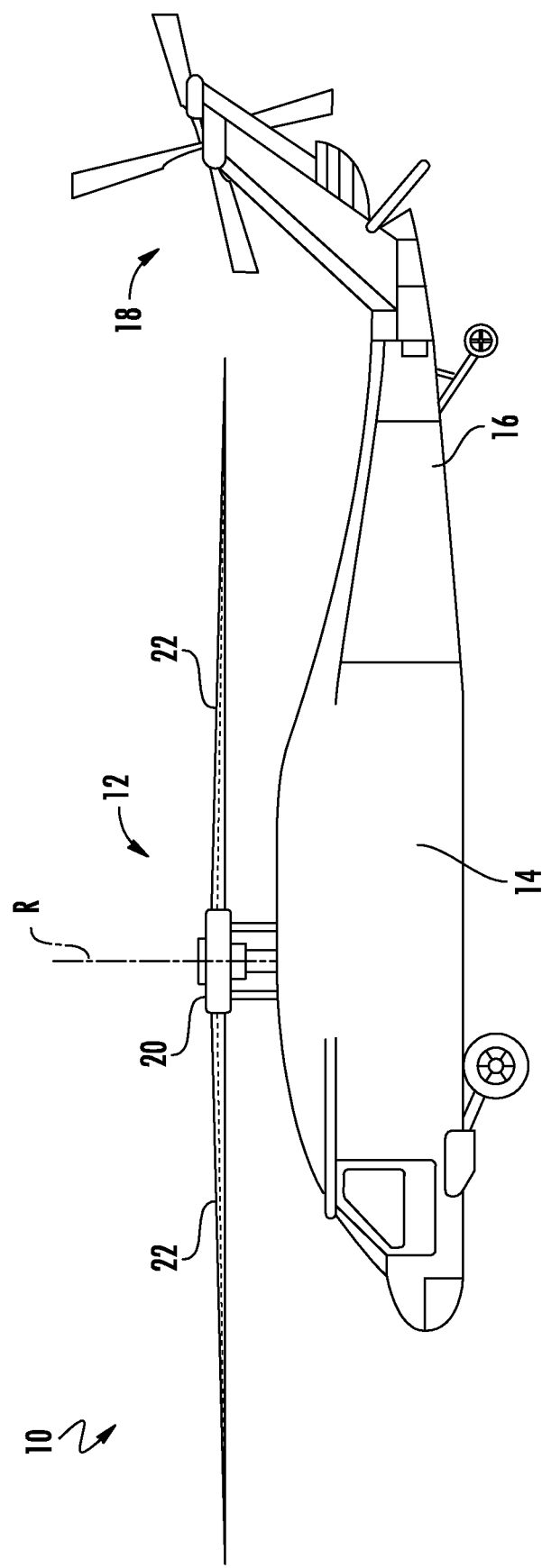
FIG. 1 depicts a rotary wing aircraft in accordance with an exemplary embodiment.

FIG. 1 schematically illustrates an example of a rotary wing aircraft 10 having a main rotor assembly 12. The aircraft 10 includes an airframe 14 having an extending tail 16 which mounts a tail rotor system 18. The main rotor assembly 12 includes a plurality of rotor blade assemblies 22 mounted to a rotor hub assembly 20. The main rotor assembly 12 is driven about an axis of rotation R through a main gearbox by one or more engines.

Although a particular helicopter configuration is illustrated and described in this example, embodiments described herein are not so limited, and can be utilized in conjunction with any aircraft or vehicle that utilizes rotor blades. Examples of such aircraft include high speed compound rotary wing aircrafts with supplemental translational thrust systems, dual contra-rotating, coaxial rotor system aircrafts, tilt-rotors and tilt-wing aircrafts, vertical takeoff and lift rotary wing aircrafts, and fixed wing aircrafts.

Figure 2:
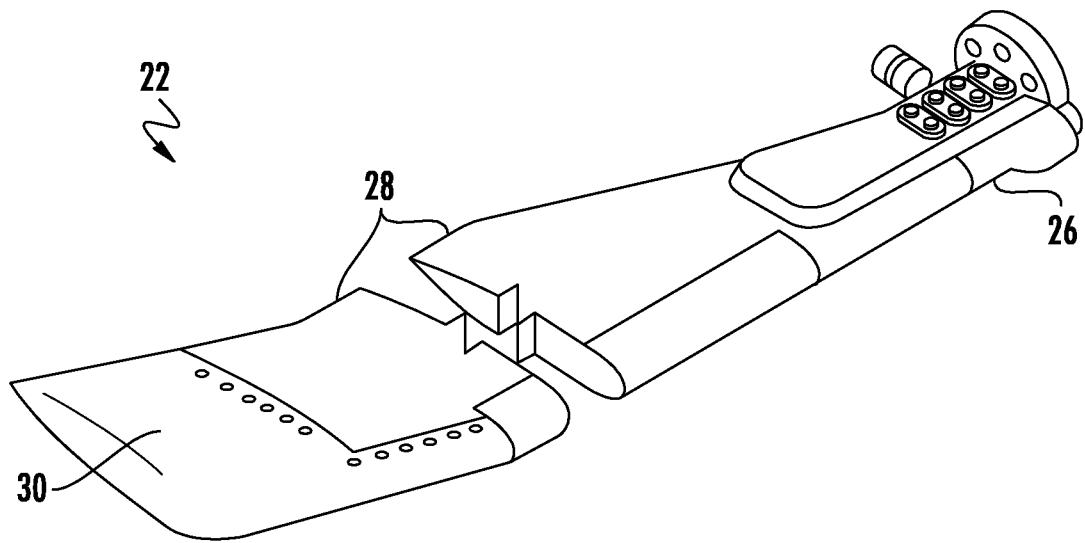
FIG. 2 depicts an embodiment of a rotor blade assembly having a replaceable tip section.
Figure 3:
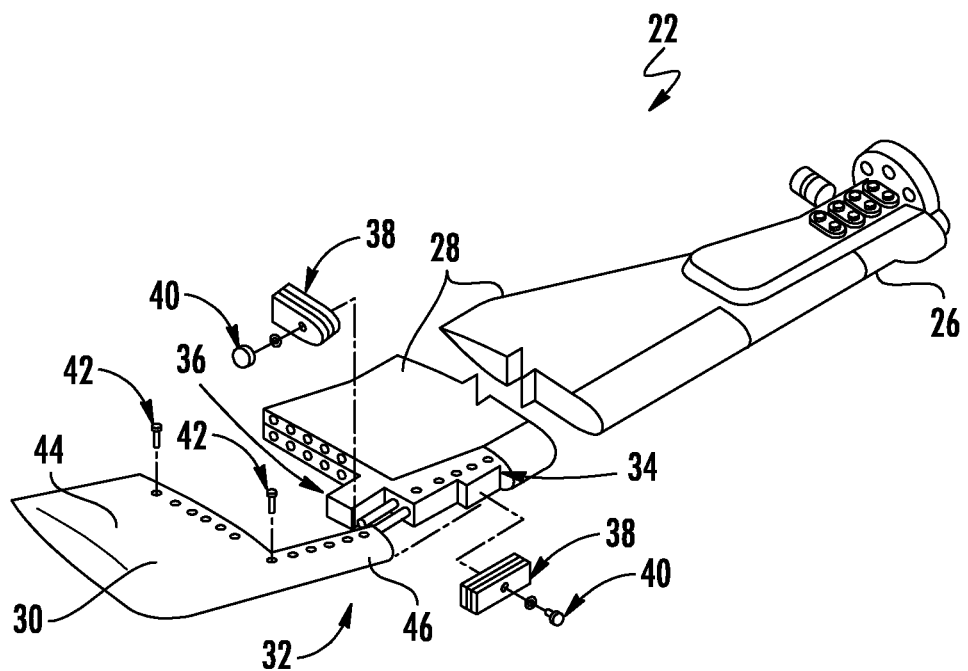
FIG. 3 depicts the rotor blade assembly of FIG. 2 in a disassembled state.

FIGS. 2 and 3 depict an example of a rotor blade assembly 22, which generally includes a root section 26, an intermediate section 28 and a tip section 30 arrayed along a rotor blade span. Each rotor blade section 26, 28 and 30 may define particular airfoil geometries to tailor the rotor blade aerodynamics to the velocity increase along the rotor blade span. Sections of the rotor blade assembly may have different airfoil shapes along the length of the rotor blade. As described herein, an "airfoil shape", or simply "airfoil", refers to a shape of the blade or blade section at a given cross section of the rotor blade assembly 22. An airfoil may have an upper airfoil and lower airfoil, as discussed further below.

The rotor blade assembly 22 may be made from composite materials, or they made be made from composite materials and metal elements, such as using composite skin and core for the airfoil shape and a titanium spar. As described herein, a composite component or composite material is a component or material made from two or more constituent materials. Examples of composite materials include fiberglass, fiber reinforced polymers, composite wood materials, resin systems and others. It is noted that composite materials, core materials and materials that can make components or section of a rotor blade assembly are not limited to those described herein.

In one embodiment, the rotor blade assembly 22 is a UH-60 blade design used in the BLACK HAWK® helicopter manufactured by Sikorsky, a Lockheed Martin Company. Other examples include blades manufactured for the Sikorsky SH-60/MH-60 SEA HAWK® helicopter, the Sikorsky SH-3 SEA KING helicopter and Sikorsky S-61L and S-61N variants.

The tip section 30, in one embodiment, is a legacy tip section that is currently used, or was previously used, as part of a rotor blade assembly. Examples of legacy blade assemblies that may have legacy tip sections include blade assemblies manufactured by Sikorsky and having Sikorsky part numbers 70150-09100-041 and 70150-09100-043, and other Sikorsky blade assemblies having base part number 70150-09100 and/or configured for use in UH60 A/L BLACK HAWK helicopters. Other examples of blade assemblies that may have legacy tip sections include blade assemblies manufactured by Sikorsky and having Sikorsky part numbers 70150-29100-041 and 70150-29100-042, and other Sikorsky blade assemblies having base part number 70150-29100 and/or configured for use in SEA HAWK helicopters. Further examples of blade assemblies that may have legacy tip sections include blade assemblies manufactured by Sikorsky and having Sikorsky base part numbers 65170-11001 and 56115-20101.

As shown in the example of FIGS. 2 and 3, the rotor blade assembly 22 may have an anhedral form, in which the tip section 30 and part of the intermediate section 28 have an anhedral or downward angle from the horizontal portion of the rotor blade assembly 22. However, the rotor blade assembly 22 may have any suitable or desired form, including a non-angled or angled form such as a dihedral, cathedral, gull, bent or other form.

The tip section 30 is attached to the intermediate section 28 by a connection assembly 32 having one or more connection features. It is noted that a portion of the intermediate section 28 inboard of the connection assembly 32 and the tip section 30 may together form a blade tip.

The connection features in this example include components of a main spar 34, such as a mounting block 36. Additional components include, for example shims 38 and washers 40 to provide for weight and balancing adjustments. The tip section 30 is attached to the intermediate section 28 via screws 42 or other fasteners, which are inserted through holes in the main spar 34 and holes arrayed along a blade tip portion 44 and a forward tip portion 46 that forms part of the leading edge of the rotor blade assembly 22.

In some cases, it is desirable to replace the tip section 30 with a replacement tip section that has a different configuration than the existing tip section 30. For example, replacement tip sections may be desired for replacement that have a more advanced anhedral design for increasing lift performance capability. However, an available replacement tip section design may not transition well with the connection assembly 32 or other main blade interface. For example, replacement tip sections may have airfoils that are significantly thicker than existing blade airfoils, which can cause fit and performance issues.

Embodiments described herein include replacement tip sections and connection assemblies that are configured to facilitate effective attachment of replacement tip sections to existing rotor blade configurations. Embodiments described herein also include methods of attaching replacement tip sections that ensure a smooth transition from an existing blade intermediate section to a replacement tip section.

The tip sections and methods described herein are configured to blend an airfoil of a loft transition region of an intermediate section for optimal fit and performance. The embodiments incorporate blended and/or hybrid airfoil designs that utilize both intermediate section and replacement tip airfoil properties, resulting in a very smooth continuous blade surface, leading edge and trailing edge.

Figure 4:
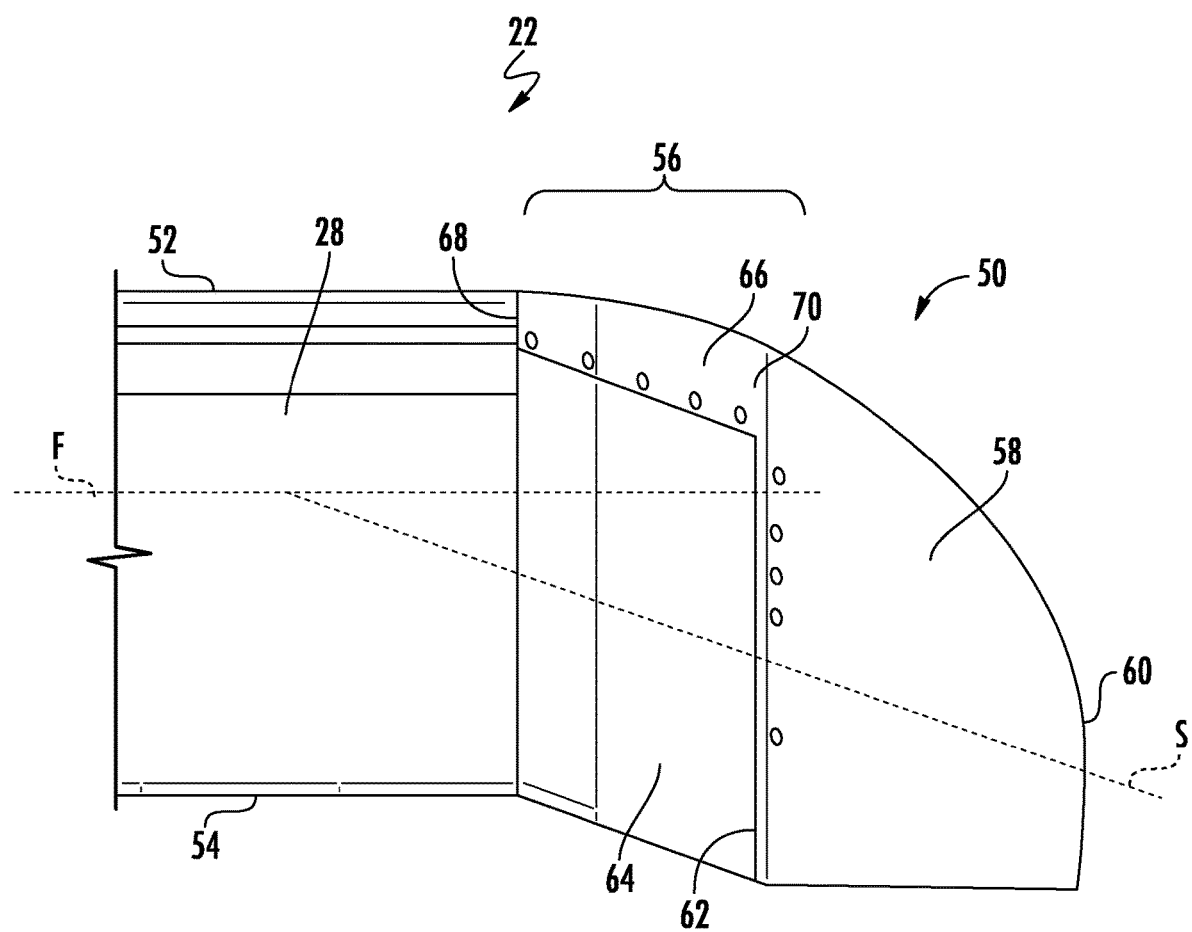
FIG. 4 depicts aspects of an embodiment of a rotor blade assembly having a replacement tip attached thereto.

FIG. 4 depicts an embodiment of a rotor blade assembly 22 including an intermediate section 28 and a replacement tip section 50. The intermediate section 28 extends along a feathering axis F, and the replacement tip section includes features that extend along a sweep axis S. As shown, an anhedral is formed by part of the intermediate section 28 and the replacement tip section 50. The intermediate section 28 defines a leading edge 52 and a trailing edge 54. In this embodiment, the intermediate section 28 was originally configured for attachment to an original or previously attached tip section, which was removed and replaced by the replacement tip section 50.

The rotor blade assembly 22 includes a connection assembly 56 that provides a smooth and aerodynamic transition between the intermediate section 28 and the replacement blade tip section 50. It is noted that a portion of the intermediate section 28, in combination with the replacement tip section 50, may form a blade tip.

Aspects of the replacement tip section 50 may include components of the connection assembly 56. In one embodiment, the replacement tip section 50 includes a tip portion 58 that has a first end 60 (an outboard end), which may form a round over. An opposing end 62 connects the tip portion 58 to a sweep region 64 of the intermediate section 28. As discussed further below, the sweep region 64 may be a pre-existing anhedral region of the intermediate section 28. Alternatively, if the sweep region 64 prior to replacement had a different thickness than the replacement tip section 50, or did not form an anhedral, the sweep region 64 may include additional layers of composite material to build up the intermediate section 28 and the sweep region 64 to transition to the replacement tip section 50.

The replacement tip section 50 includes a transition region 66 that extends along a leading edge of the rotor blade assembly 22. The transition region 66 has a first end 68 configured to conform to a leading portion of an airfoil at an end of the intermediate section 28, e.g., over the sweep region 64. The transition region 66 has a second opposing end 70 that forms a leading portion of an airfoil at the end 62 of the tip portion 58.

As described herein, conforming the transition region 66 or other component to an airfoil refers to matching the shape of the airfoil so that a smooth transition can be established. The shape can be matched by matching various airfoil properties. Examples of such properties include chord length, thickness to chord (t/c) ratio, maximum thickness (MT), ¼ chord point, upper and lower MT points, maximum mid thickness point and twist angle.

In one embodiment, the transition region 66 is configured as a leading edge cap made from one or more composite skins, which can be bonded to the sweep region 64, and/or attached in another suitable manner (e.g., by attaching with mechanical fasteners such as screws or using both bonding and fasteners). As described below, in one embodiment, the sweep region 64 is formed by bonding one or more upper and lower composite skin layers that can be bonded onto pre-existing composite skins of the sweep region 64 and/or other portions of the intermediate section 28.

Figure 5:
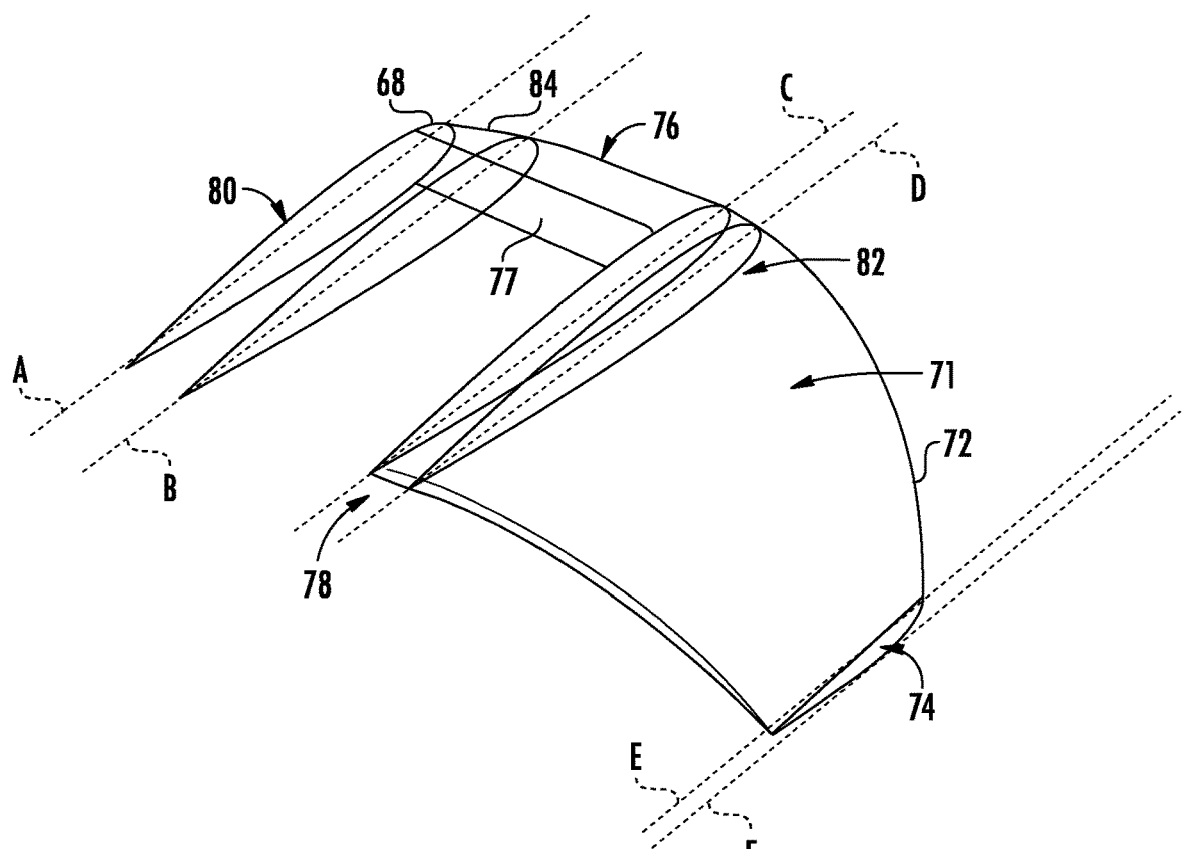
FIG. 5 depicts an embodiment of a replacement tip section including a transition region and a hybrid region configured to allow for attachment to an existing (legacy) rotor blade design.
Figure 6:
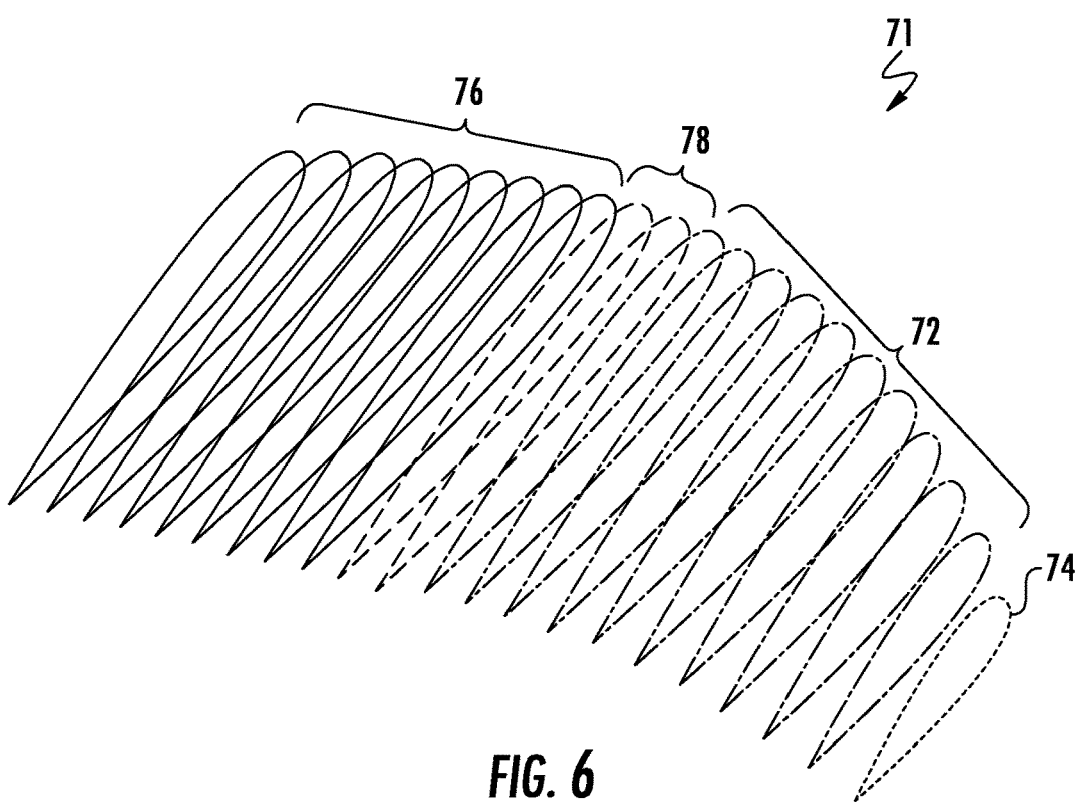
FIG. 6 depicts a plurality of wire frame representations showing airfoils formed by the replacement tip section of FIG. 8.

FIGS. 5 and 6 show an embodiment of a replacement tip section 71, which includes a swept tip portion 72, an end portion 74 at an outboard end of the replacement tip section 71 (forming, e.g., a round over), a transition region 76 (which may be similar to the transition region 66), and a hybrid region 78, and illustrates airfoil properties thereof. In this embodiment, the transition region 76 extends from an end 80 of the intermediate section 28, which has a first airfoil. The transition region 76 forms a leading portion of an airfoil, and transitions to a second airfoil at a connection point with the hybrid region 78. In one embodiment, the transition region 76 forms an opening 77 into which the intermediate section 28 can be inserted to attach the transition region 66 and the blade tip portion 58 to the intermediate section 28. The hybrid region 78 in turn has a variable or blended airfoil configuration that gradually changes to conform to the airfoil at a first end 82 of the replacement tip section 71. The replacement tip section 71, in one embodiment, can be installed onto a rotor blade assembly as a single piece.

FIG. 6 illustrates various airfoils at locations or positions along a span of the replacement tip section 71. It is noted that the airfoils shown in FIGS. 5 and 6 extend perpendicular or normal to a feathering axis (e.g., the axis F). The airfoils are not so limited, as some or all of the airfoils may extend along a different axis, such as a sweep axis (e.g., the axis S).

Referring again to FIG. 5, examples of the position or location of various components or portions of the transition region 76, the hybrid region 78 and the replacement tip section 71 are shown relative to a blade span. The locations are shown as lines representing cross-sections of the rotor blade assembly 22 in a direction perpendicular or normal to the feathering axis F. In this embodiment, the transition region 76 begins at line A and has an airfoil that conforms to the airfoil at the intermediate section 28. The transition region 76, in one embodiment, forms a curved portion 84 between lines A and B, and further transitions from line B to line C at the beginning of the hybrid region 78.

The hybrid region 78 has a variable airfoil configuration that forms airfoils along the hybrid region that vary so that the shape and size (e.g., chord length, thickness, t/c ratio, etc.) of the hybrid region 78 varies from a first airfoil at line C configured to conform to the swept tip portion 72, to a second airfoil at line D configured to conform to the replacement tip section 71. The swept tip portion extends from line D to the end portion 74, which extends from line E to line F. As shown, the transition and hybrid regions extending from line A to B and line B to C comprise only a partial airfoil (i.e., the leading edge of the rotor blade), and attach to the existing rotor blade assembly 22 to form a complete airfoil. In contrast, the swept tip portion 72 forms a complete airfoil which extends from the end of the existing rotor blade.

The portions and regions have selected lengths based on the type of replacement blade portion, design and performance considerations and other factors. An example of replacement tip section and intermediate section dimensions has a distance of about 299 inches (about 7.59 meters) from the axis of rotation R of the main rotor assembly. In this example, the distance from line A to line B is about one (1) inch (about 2.54 centimeters or cm), the distance from line B to line C is about 8.68 inches (about 22.05 cm), the distance from line C to line D is about 1.32 inches (about 3.35 cm), the distance from line D to line E is about 11 inches (about 27.94 cm), and the distance from line E to line F is about one (1) inch (about 2.54 cm). The distances in this example are along a feathering axis extending from the axis of rotation R. It is noted that this example is not intended to be limiting, as portions of the replacement tip section and/or intermediate sections can have any desired length between the various lines.

Figure 7:
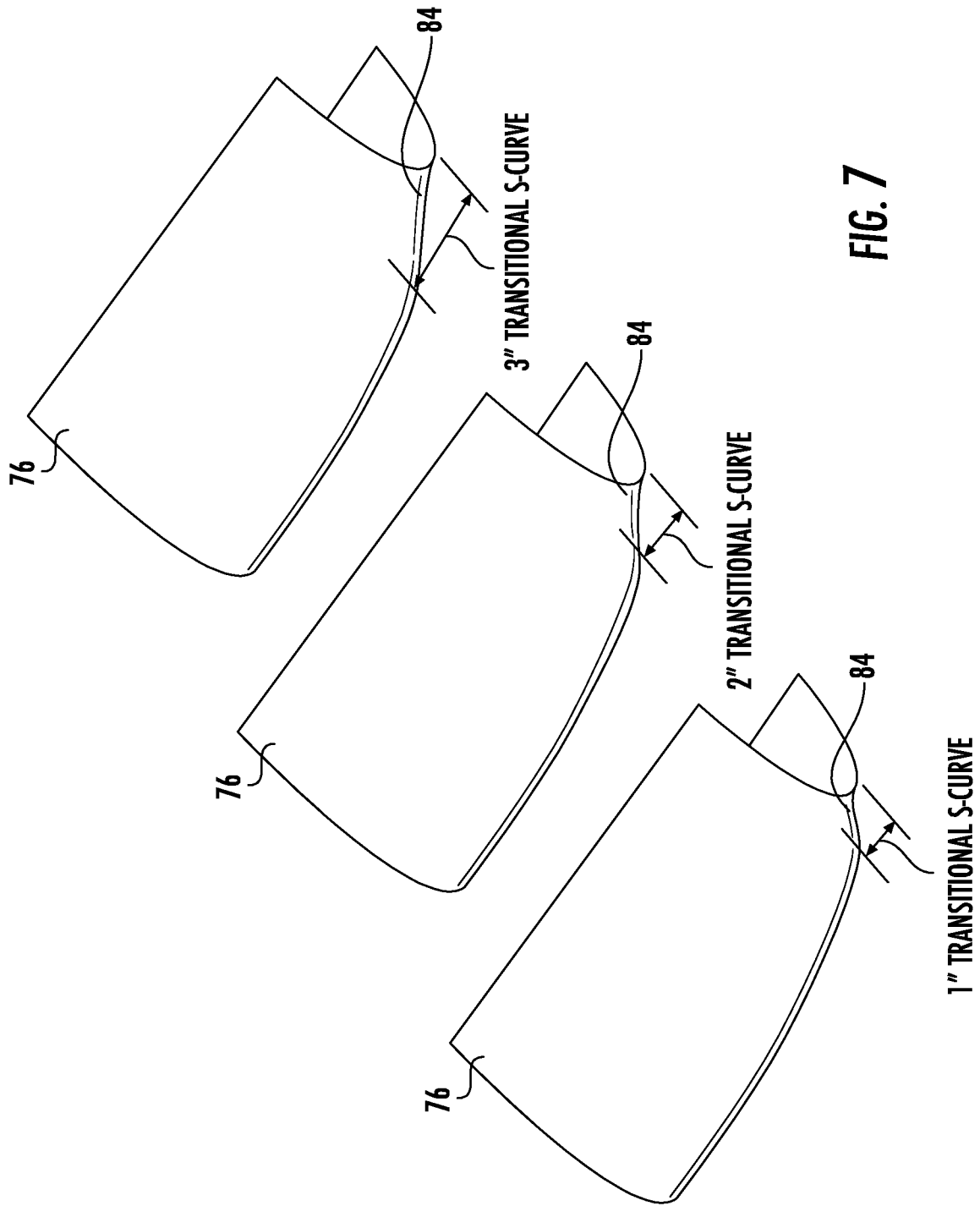
FIG. 7 depict examples of aspects of a transition region configured to be attached to a replacement blade tip.

As noted above, the transition region 76 may include a curved portion 84 that facilitates an aerodynamic shape transition from the end 80 to a location along the transition region 76. For example, as shown in FIG. 7, the curved portion 84 forms a transition S-curve that may have various widths and curvatures depending on the configuration of the intermediate section 28 and a replacement tip section.

Figure 8:
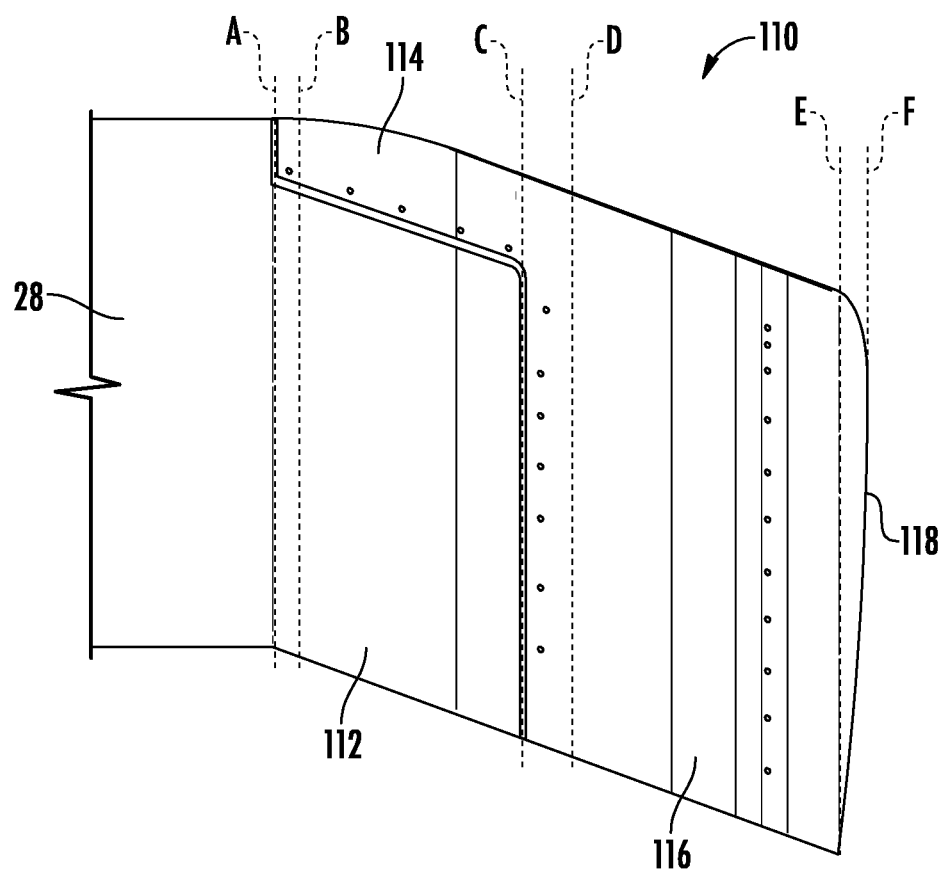
FIG. 8 is a view of a portion of a rotor blade assembly having an existing tip section, and illustrates axial positions of the replacement tip section of FIGS. 4 and 5 when the existing tip section is replaced with the replacement tip section of FIGS. 4 and 5.

FIG. 8 is a view of a portion of the rotor blade assembly 22 having an example of an existing tip section 110, also referred to as a legacy tip section, and illustrates an example of the axial positions of the replacement tip section 71 of FIGS. 5 and 6 when the existing tip section 110 is replaced with the replacement tip section 71. Lines A-D of FIG. 5 correspond to lines A-D of FIG. 8.

The existing tip section 110 is attached to a sweep portion 112 of the intermediate section 28, and has a leading portion 114, a tip portion 116 and an end portion 118 forming a tip round over. FIG. 8 demonstrates how a replacement tip section such as the replacement tip section 71 can be installed on an existing intermediate section without requiring substantial redesign of the intermediate section.

FIGS. 9-13 illustrate an embodiment of a method of replacing a tip section of a rotor blade assembly. It is noted that the following description includes a number of method steps or stages. The method may be performed as described below and include all of the steps or stages in the order described. The method is not so limited, as the method may include fewer than all of the steps or stages, or may include performing one or more of the steps or stages in a different order than that described below. The method is described with reference to an example of an existing flat (non-anhedral) tip section and an anhedral replacement tip section. It is noted that the method is not limited to the following example, and may be used with any suitable rotor blade assembly, existing tip section and replacement tip section having any desired configuration.

In a first stage, shown in FIG. 9, an existing or legacy tip section 90 is removed from an end of an intermediate section 92 of a rotor blade assembly. The intermediate section 92 may be the intermediate section of the rotor blade assembly 22 of FIG. 1. The intermediate section 92 includes a titanium alloy spar 94 on which is attached a mounting block 96 originally configured for attachment to the existing tip section 90. The mounting block 96 extends from a portion 98 that is formed from a composite core and composite skins forming an airfoil. The mounting block 96 may be aluminum, although other materials (including aluminum, titanium or a composite) may be used. Removal of the existing tip section 90 includes removing existing fasteners such as screws from fastening points 100 from holes in the existing tip section 90 and the spar 94.

For example, the intermediate section 92 may be part of one of the legacy rotor blade assemblies and/or be attached to one of the legacy tip sections described as examples above. The existing or legacy tip section 90, in one example, is attached to a rotor blade assembly for a BLACK HAWK helicopter having a titanium spar manufactured by Sikorsky, such as a spar having Sikorsky base part number 70150-09102 (e.g., Sikorsky part number 70150-09102-041 or 70150-09102-042). In another example, the existing section 90 is attached to a rotor blade assembly for a SEA HAWK helicopter having a titanium spar manufactured by Sikorsky, such as a spar having Sikorsky base part number 70150-29002 (e.g., a spar having Sikorsky part number 70150-29002-041).

The mounting block 96 may include or be part of an aluminum tip block manufactured by Sikorsky and having Sikorsky base part number 70150-09133 (e.g., Sikorsky part number 70150-09133-041 or 70150-09133-043).

Figure 10B:
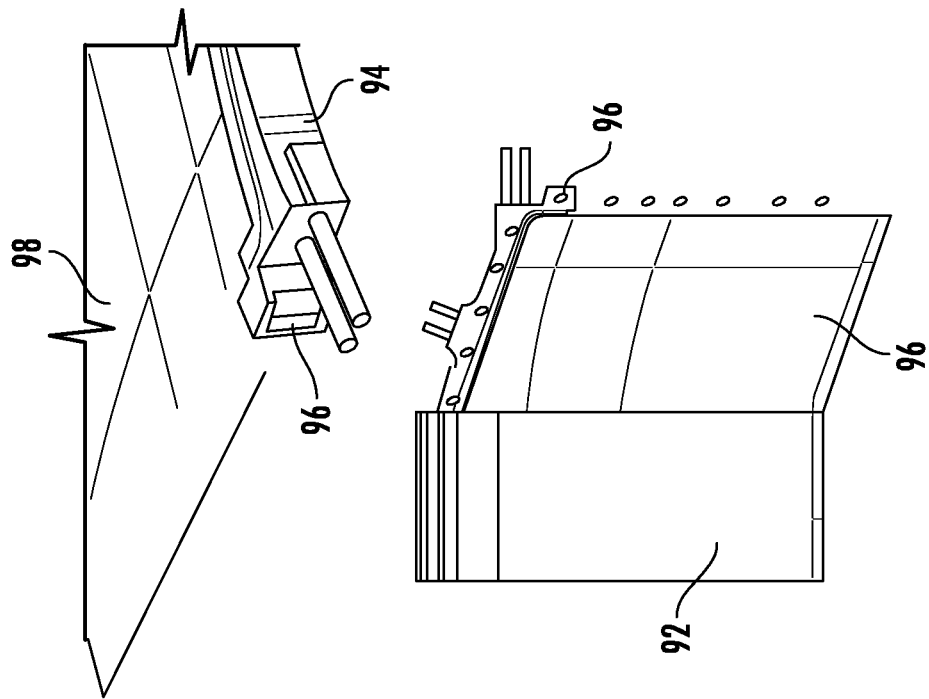
FIGS. 10A and B (collectively referred to as FIG. 10) depict aspects of the method of FIG. 9.
Figure 10A:
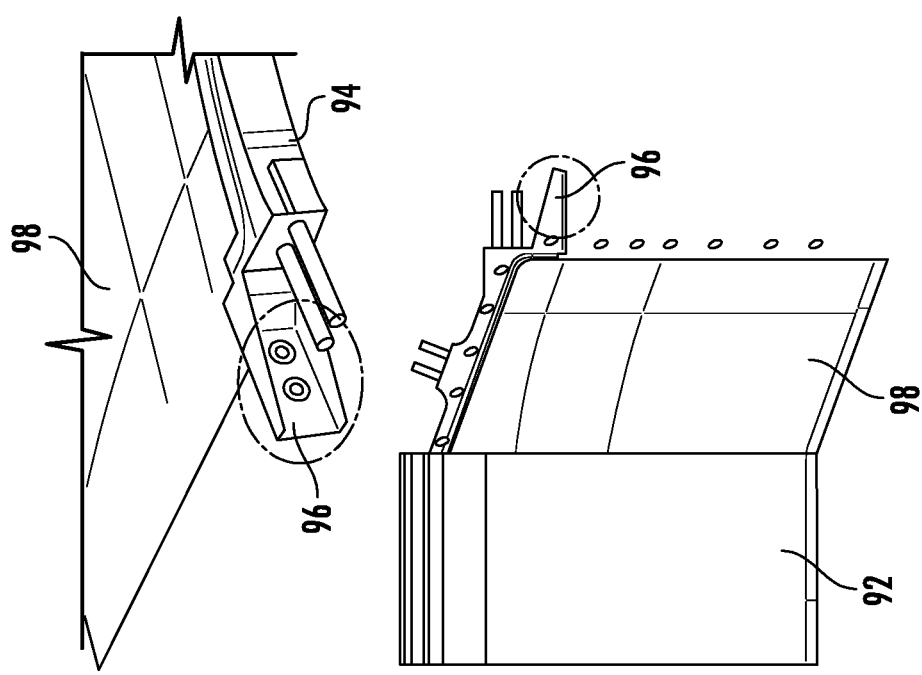

In a second stage, shown in FIG. 10, the mounting block 96 is trimmed so that the mounting block 96 does not interfere with a replacement tip section, which may have a different configuration that the existing tip section. For example, if the replacement tip section forms an anhedral, the mounting block 96 is trimmed so as not to interfere with the anhedral. FIG. 10A shows the mounting block prior to trimming, and FIG. 10B shows the mounting block 96 after trimming.

Figure 11A:
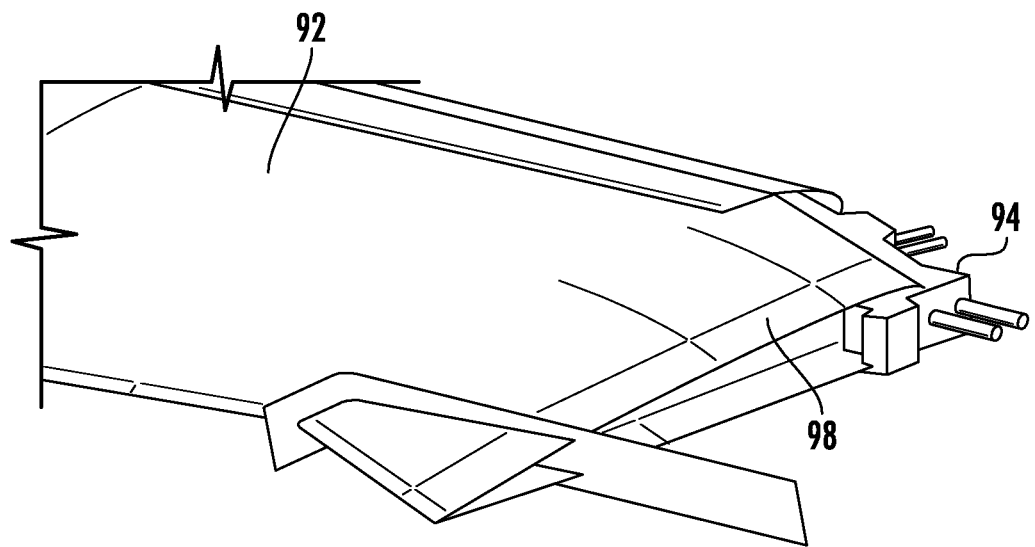
FIGS. 11A and B (collectively referred to as FIG. 11) depict aspects of the method of FIGS. 9 and 10.
Figure 11B:
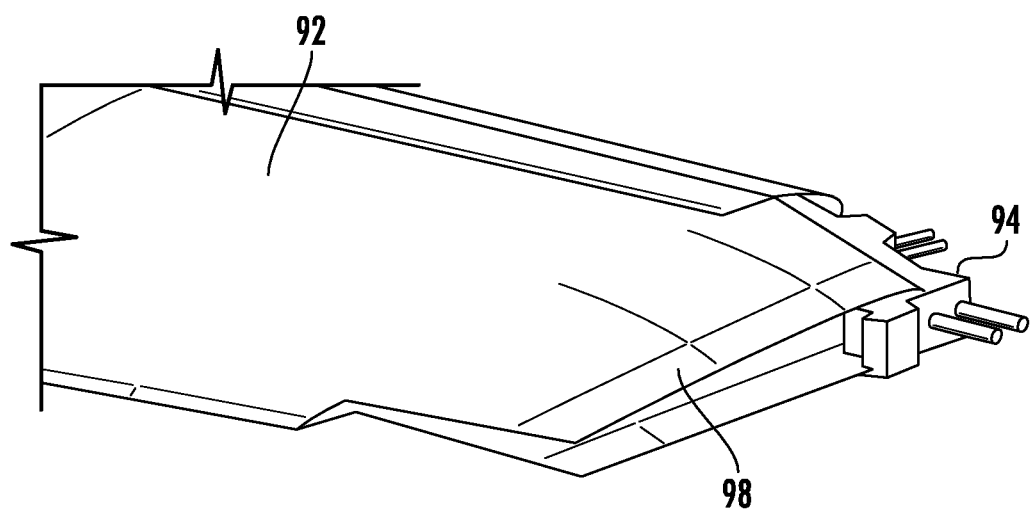

In the third stage, shown in FIG. 11, the trailing edge of the portion 98 is trimmed to ensure a smooth trailing edge transition and avoid interfering with the replacement tip section. FIG. 11A shows the portion 98 prior to trimming, and FIG. 11B shows the portion 98 after trimming.

Figure 12A:
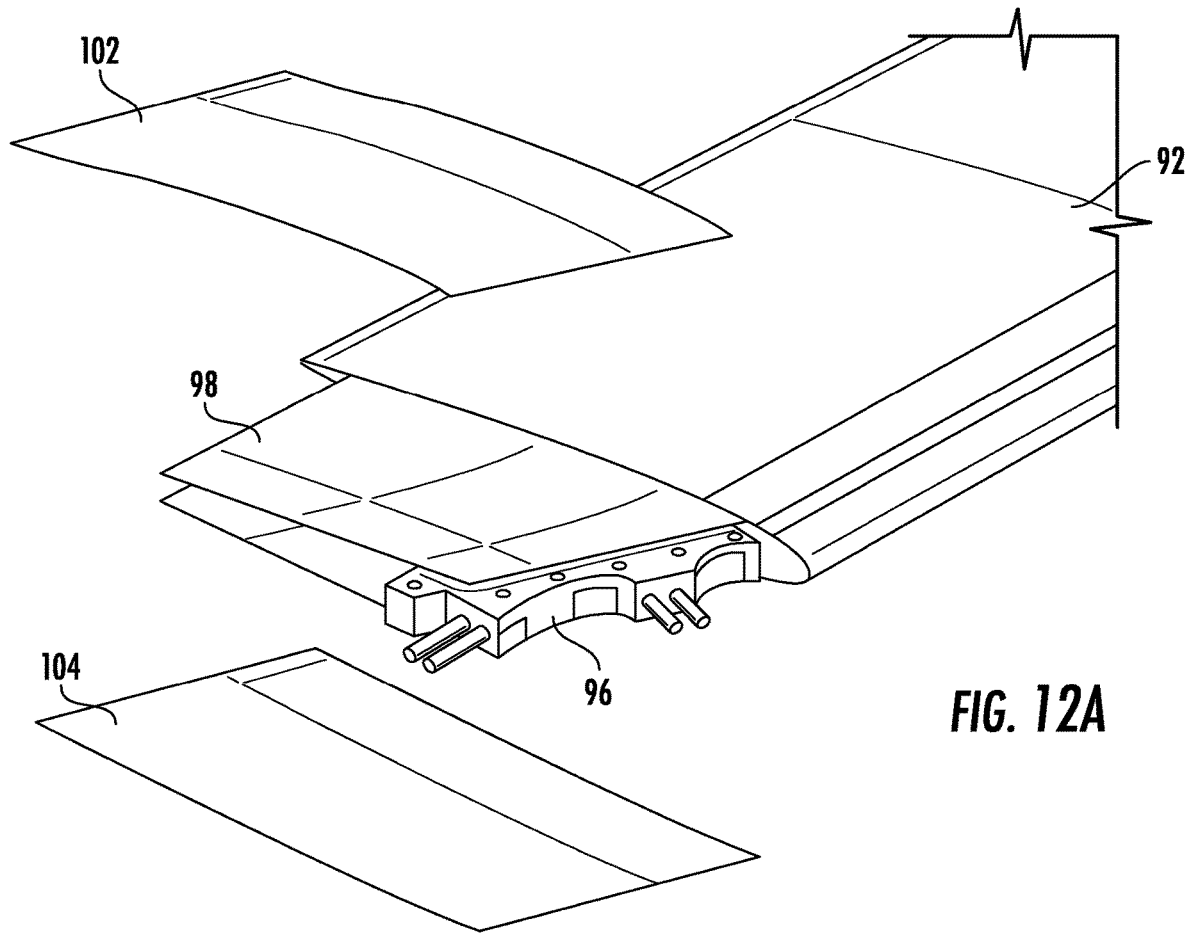
FIGS. 12A and B (collectively referred to as FIG. 12) depict aspects of the method of FIGS. 9-11.
Figure 12B:
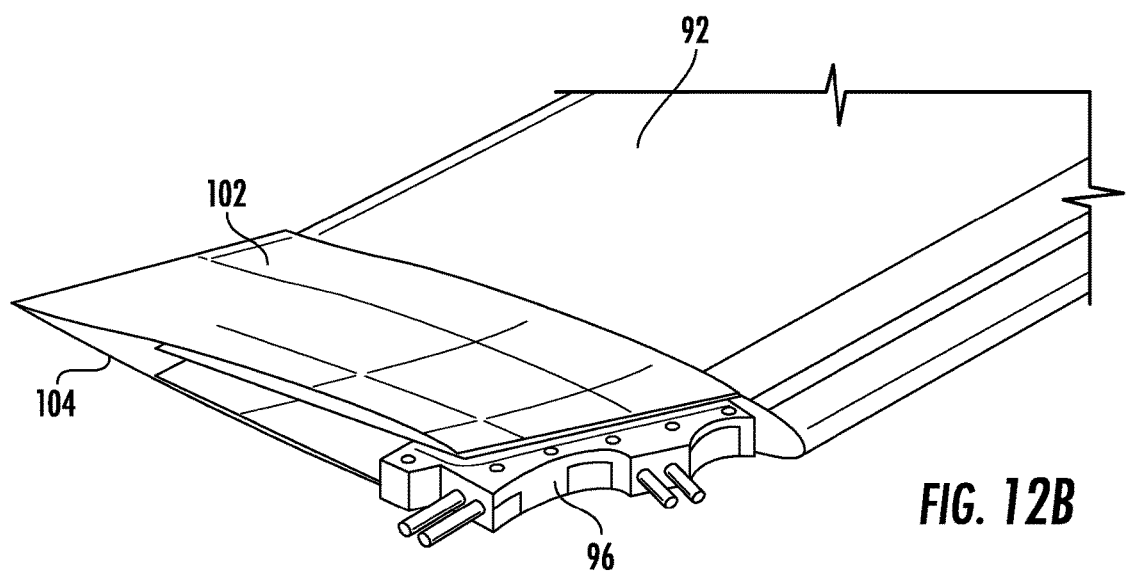

In the fourth stage, shown in FIG. 12, new composite skins may be bonded to the remaining surfaces of the anhedral portion to provide a smooth and consistent airfoil shape when a replacement tip section is attached. For example, an upper skin 102 is bonded to an existing upper skin of the portion 98, and a lower skin 104 is bonded to an existing lower skin of the portion 98. The upper and lower skins form an airfoil that conforms to the airfoil shape or at least permits a transition region of a replacement tip section to be properly positioned at a leading edge. The upper skin 102 and the lower skin 104 may have any number of layers and/or thicknesses to provide a desired transition from the intermediate section 92. For example, the upper skin 102 and the lower skin 104 may have thicknesses and/or thickness variations that correspond to the thickness of the replacement tip section. In addition, if the replacement tip section is an anhedral tip section, the upper skin 102 and/or the lower skin 104 are applied to form an anhedral configuration. However, it is understood that the skins 102 and 104 and the fourth stage need not be used in all aspects, such as if the transition region 76 shown in FIG. 5 is shaped to directly attach to the rotor blade assembly.

Figure 13A:
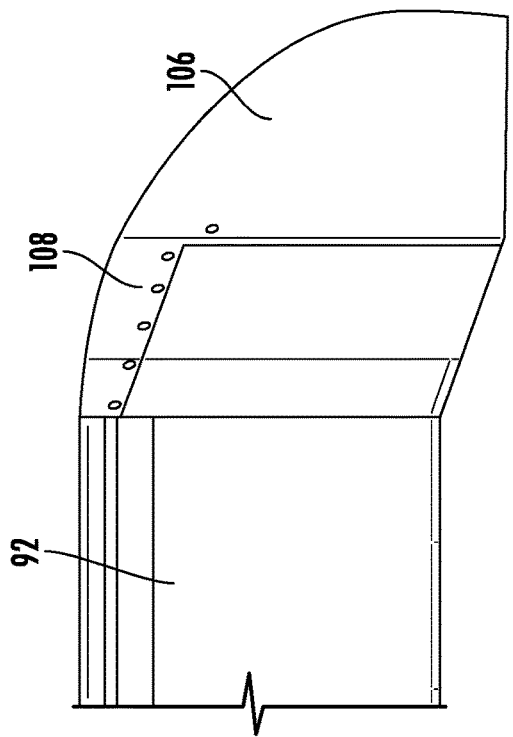
FIGS. 13A, B and C (collectively referred to as FIG. 13) depict aspects of the method of FIG. 9-12.

In the fifth stage, shown in FIG. 13, a replacement tip section 106 (e.g., the replacement tip section 50 or 80) is attached to the modified portion 98. The replacement tip section 106 includes a transition region 108 is mounted over a forward end of the portion 98 and the upper and lower skins 102 and 104, and the replacement tip section 106 is mounted on the spar 94 and may be attached via screws (e.g., at attachment points 100). It is noted that the replacement tip section 106 (including the transition region 108) can be attached to the intermediate section 92 as a single piece.

Figure 13B:
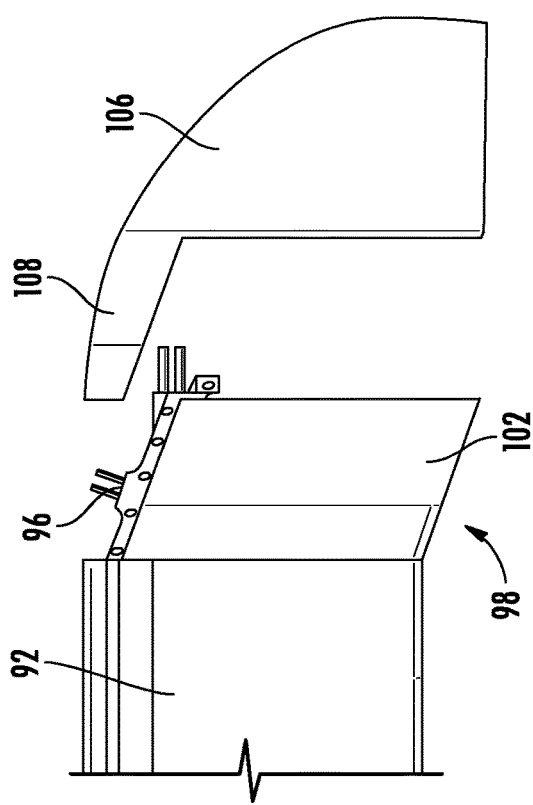
Figure 13C:
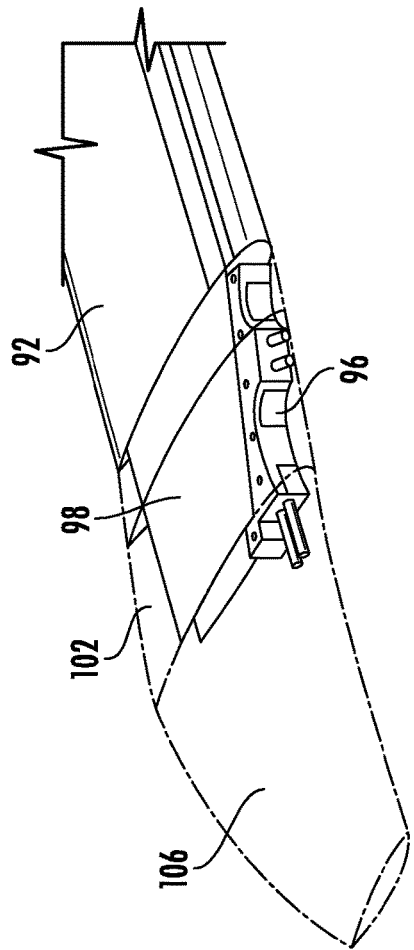

As shown in FIGS. 13B and 13C, the rotor blade assembly exhibits a smooth and aerodynamic transition between the intermediate section and the replacement tip section.

As demonstrated in FIGS. 9-13, the rotor blade assembly 22 can be converted to a new tip design using an existing intermediate section without the need to strip and rebuild or design new components. The newly bonded upper and lower skins transition the blade skin, mating a new tip section airfoil shape to the rest of the blade seamlessly.

Embodiments described herein present a number of advantages and technical effects. For examples, the embodiments provide systems and methods that allow for efficient and effective replacement of a tip section of a rotor blade. Tip section replacement may be performed to improve aircraft performance, such as lift, hover and/or cruise performance A replacement tip section may have different characteristics than an existing tip section, which poses significant challenges in replacement. For example, replacement tips may have different thicknesses and other airfoil properties that make it difficult to transition from a blade section to a replacement tip section. Embodiments described herein address such challenges and provide ways to replace tip sections while retaining the desired performance properties of the blade, and without the need to redesign an entire blade assembly.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of replacing a tip section of a rotor blade, comprising:
    removing a legacy tip section from an end of an intermediate section of the rotor blade to expose a connection feature at the end of the intermediate section; and
    connecting a replacement tip section to the intermediate section, the replacement tip section including a blade tip portion having a first end and an opposing end, and a transition region which extends from the blade tip portion to form a leading edge of the rotor blade at the intermediate section, wherein the connecting includes attaching the transition region to a forward end of the connection feature to form the leading edge at the intermediate section, the transition region including a first end having a first airfoil that conforms to an intermediate section airfoil at the connection feature, and a second end having a second airfoil that conforms to the blade tip portion;

wherein the connection feature includes a component previously configured to connect the intermediate section to the legacy tip section, and attaching the transition region includes modifying the component to adapt the component to permit attachment of the replacement tip section.

2. The method of claim 1, wherein the transition region includes a curved portion at the leading edge that transitions the transition region to an intermediate section leading edge.

3. The method of claim 1, wherein the replacement tip section includes a hybrid region having a leading edge and a trailing edge configured to conform to a corresponding leading edge and a corresponding trailing edge of the blade tip portion.

4. The method of claim 3, wherein the hybrid region forms a variable airfoil that varies from a first airfoil configured to conform to the transition region to a second airfoil configured to conform to the blade tip portion.

5. The method of claim 3, wherein the hybrid region extends from the transition region to the blade tip portion.

6. The method of claim 3, wherein the hybrid region is configured to form a smooth transition of the leading edge from the transition region to a sweep zone of the blade tip portion.

7. The method of claim 1, wherein connecting the replacement tip section includes bonding one or more composite skin layers to pre-existing upper and lower composite skins of the intermediate section, and attaching the transition region to a forward end of the one or more composite skin layers, the one or more composite skin layers forming an airfoil that conforms to the blade tip portion.

8. The method of claim 7, wherein connecting the replacement tip section includes trimming a trailing portion of the intermediate section to accommodate the replacement tip section.

9. The method of claim 1, wherein the transition region is configured to be attached to the intermediate section by existing fastening features.

* * * * *